May 24, 1927.
R. S. MOORE
1,629,521
AUTOMOTIVE CRANE
Filed Feb. 27, 1922    3 Sheets-Sheet 1
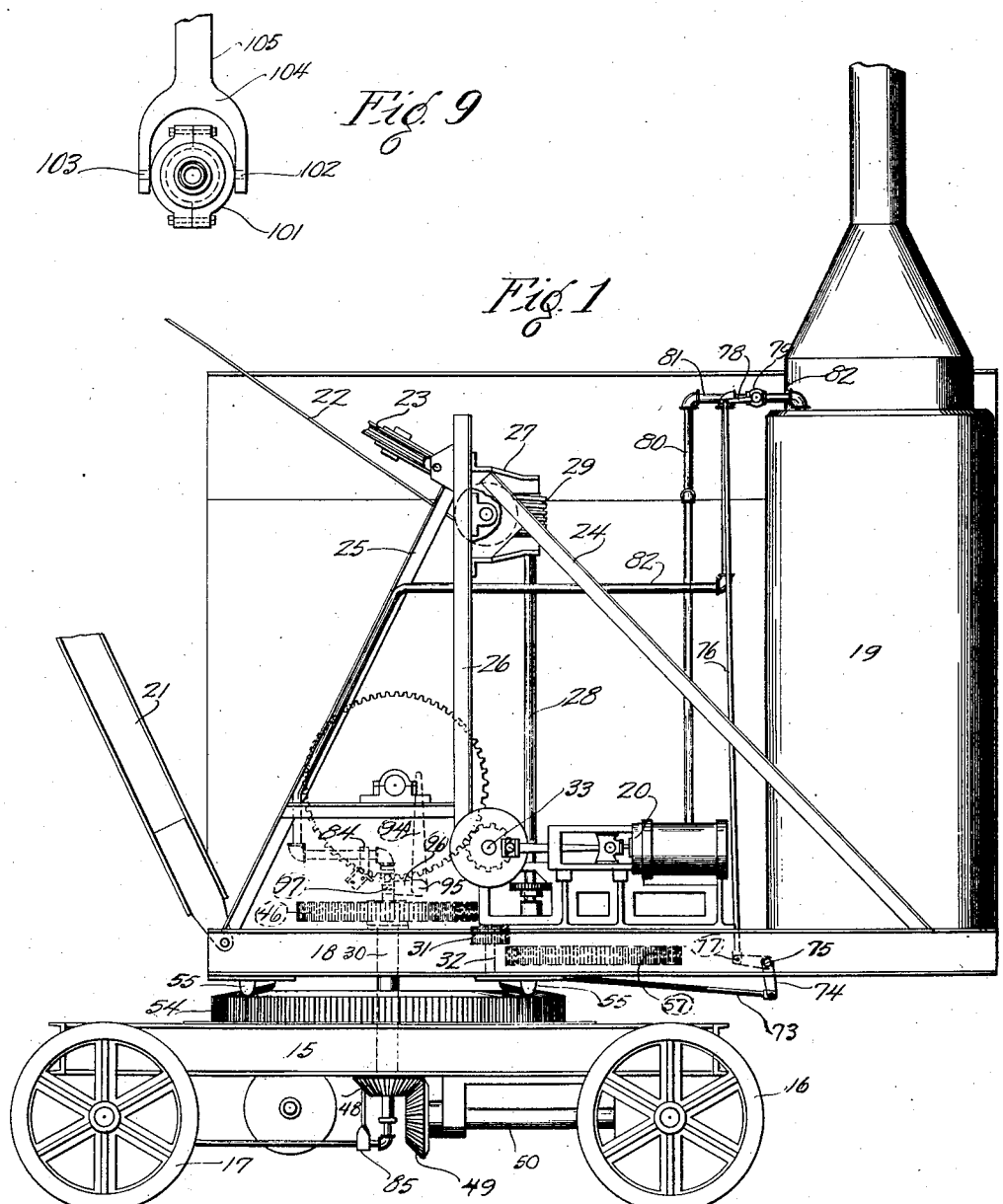

May 24, 1927.  
R. S. MOORE  
AUTOMOTIVE CRANE  
Filed Feb. 27, 1922      3 Sheets-Sheet 2
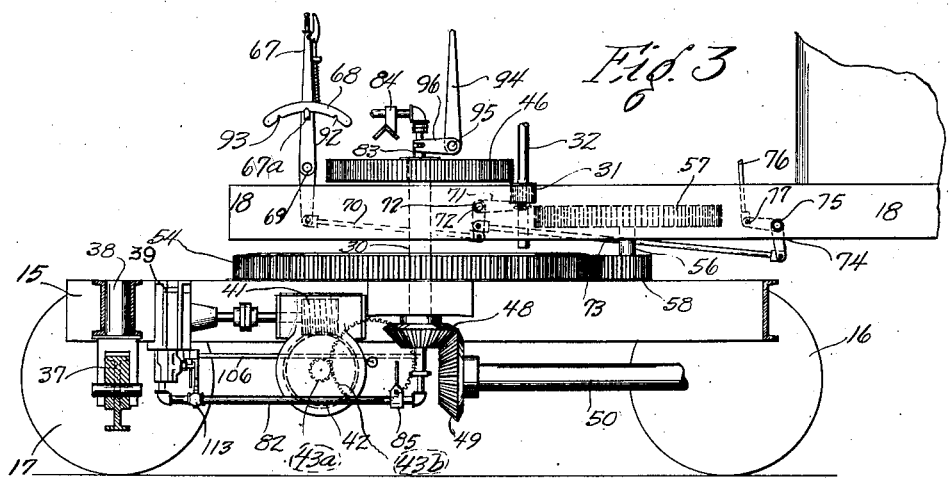
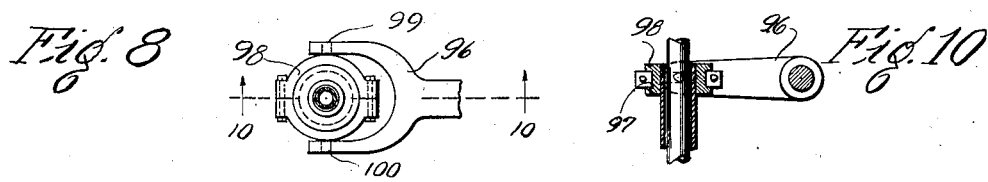
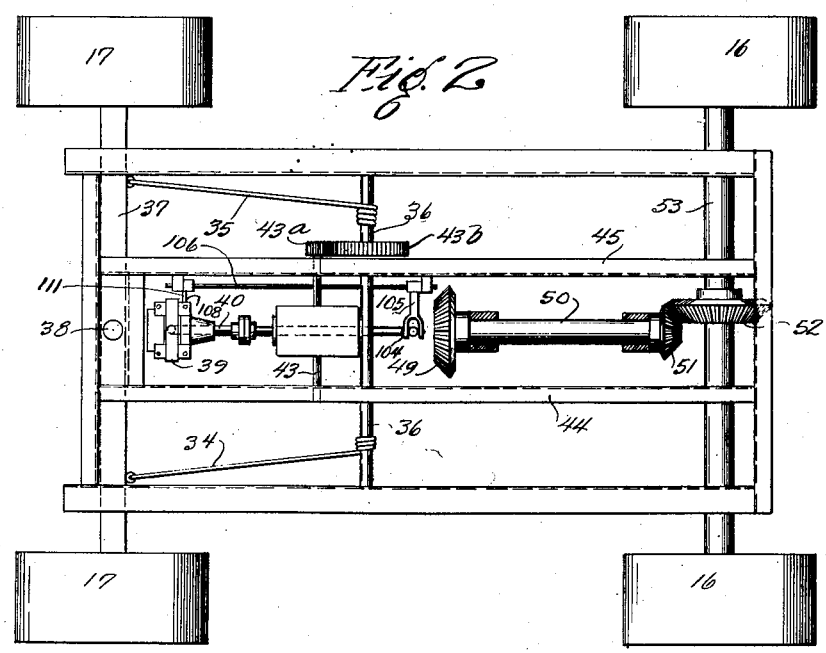

May 24, 1927.  
R. S. MOORE  
AUTOMOTIVE CRANE  
Filed Feb. 27, 1922  
1,629,521  
3 Sheets-Sheet 3
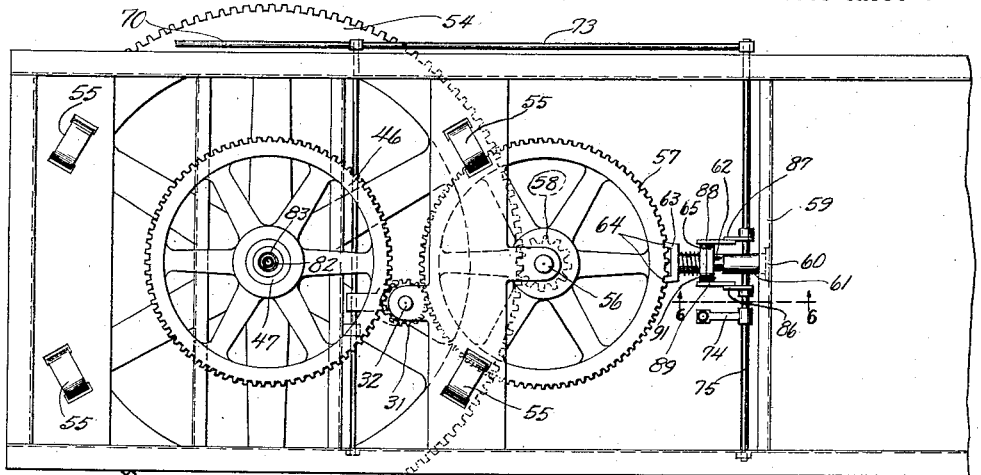
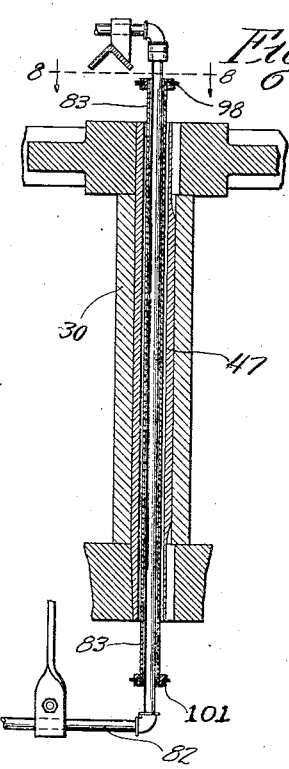
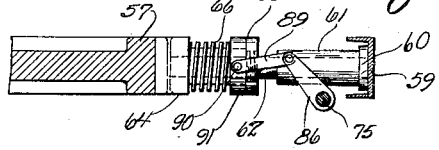
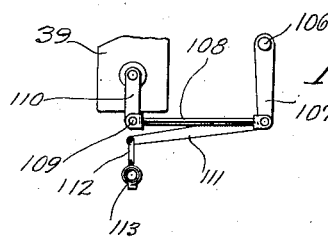

Patented May 24, 1927.

1,629,521

UNITED STATES PATENT OFFICE.

ROY S. MOORE, OF CHICAGO, ILLINOIS, ASSIGNOR, BY MESNE ASSIGNMENTS, TO MANITOWOC SHIP BUILDING CORPORATION, OF MANITOWOC, WISCONSIN, A CORPORATION OF WISCONSIN.

AUTOMOTIVE CRANE.

Application filed February 27, 1922. Serial No. 539,402.

The invention is applicable to devices having automotive trucks with a swing body or rotatable bed mounted thereon with the source of power for operating the device mounted on the swing body or rotatable bed, such as automotive cranes, steam shovels and the like.

In such devices it is customary to mount a swing body or rotatable bed on an automotive truck with a suitable source of power, as steam or gas engine mounted on the swing body where the operator of necessity must be stationed.

It has heretofore been proposed to steer devices of this character in various ways, in some instances by a train of gearing, others by shifting the steering wheels by hand independently of the movement of the swing body or rotating bed, while in other devices the steering wheels are moved simultaneously with and by the movement of the swing body or rotatable bed, all of which means of steering have their objectionable features.

An object of my invention is to provide improved means for operating the steering wheels by a steering engine, supplying steam to the steering engine from the boiler mounted on the swing body. The mechanism of my improved device is such that when the steam is cut into the steering engine by operation of the control lever the travel power mechanism is thrown into gear and the mechanism for rotating the swing body or rotating bed is thrown out of gear automatically, or when the mechanism for rotating the swing body or rotatable bed is thrown into gear by the reverse operation of the control lever the travel mechanism is automatically thrown out of gear.

I also provide improved means for starting and stopping the steering power synchronously with the operation of the gear shift mechanism for connecting the swing body and travel mechanisms respectively with the power source.

It is a further object of the invention to provide in a crane of the described character improved means for locking the swing body against swinging when the travel mechanism is operatively connected to the power source.

In the drawings I have shown an automotive crane which is operated by steam power, the steam for operating the steering wheels being carried by a pipe from the steam boiler mounted on the swing body down through the hollow pivotal connection between the truck frame and the swing body and to a steam engine adjacent the forward axle of the truck, which has mounted thereon the steering wheels. The pipe for conducting the steam from the boiler on the swing body to the engine for operating the steering wheels is rigidly supported at its upper portion by the swing body and by supports carried by the truck frame at its lower end and held in spaced relation to the interior walls of the hollow pivotal connection between the swing body and the truck in order to prevent noise and chattering caused by the vibration of the machine when in operation. Around the steam pipe extending downwardly through the pivotal connection and within the connection I place a reciprocating sleeve for operating the throttle valve of the steering engine. This reciprocating sleeve is supported and operated by an operating lever mounted on the frame of the machine adjacent the gear shifting lever for the travel and swing body mechanism, which gear shifting lever is carried by the swing body. By this arrangement all of the means for controlling the different mechanisms of the device are placed within ready and easy reach of the operator on the swing body.

In the accompanying drawings, Fig. 1 is a side elevation view of my improved crane with some of the parts removed for clarity of illustration.

Fig. 2 is a top plan view of the truck frame showing the engine, with its correlated parts for operating the steering wheels.

Fig. 3 is a side elevation view of my device showing the shifting levers in neutral position and the shifting gear out of mesh with the operating gears, and the worm gear for imparting steering movement to the steering wheels, the truck frame being in section and part of the swing body being broken away.

Fig. 4 is a top plan view of the travel gear, the sliding gear and the gear for rotating the swing bed, the latter being shown as locked against rotation.

Fig. 5 is a vertical sectional view of the hollow pivotal connection between the swing body and the truck frame with the steam pipe and the steering engine control passing therethrough.

Fig. 6 is a detail view partly in section of the lock for locking the gear for rotating the swing body.

Fig. 7 is a detail view of the lever with links for synchronously operating the throttle valve of the steering engine and the drain valve in the steam pipe leading thereto.

Fig. 8 is a top plan detail view of the forked arm for operating the reciprocating sleeve passing through the pivotal connection between the swing body and the truck showing the grooved collar, the pivotal member and the steam pipe in section.

Fig. 9 is a bottom plan view of the forked arm for operating the throttle lever of the steering engine showing the grooved collar as attached to the reciprocating sleeve and the sleeve and steam pipe in section.

Fig. 10 is a vertical sectional view taken on line 10—10 of Fig. 8.

The automotive crane illustrated in the drawings comprises a truck consisting of a frame 15, propelling wheels 16 and steering wheels 17. Mounted on the truck and rotatable about a fixed axis is a platform 18 having mounted thereon the power mechanism, such as a boiler 19 and engine 20, and the hoisting mechanism consisting of a boom and its co-operating devices, a portion of the boom being shown at 21, a portion of the hoisting cable at 22, and a sheave at 23, suitable braces 24 and 25 being provided for upright support 26, which has at its upper end bracket 27 in which is journalled the vertical driving shaft 28. Shaft 28 has affixed to its upper end worm 29 for rotating the cable drum. The platform 18 is connected to the truck frame by means of a hollow rotatable connecting member 30 and rotary movement is imparted to the platform by means of the toothed gear 31, which is nonrotatably mounted on the main power shaft 32, and adapted to have reciprocal movement longitudinally thereof, shaft 32 being operably connected by suitable gearing (not shown) to the crank shaft 33 of the engine. The details of the above described mechanism being well known a more minute description thereof is not deemed necessary.

The steering wheels of the truck are controlled by cables 34 and 35 arranged one on each side of the machine, with their inner ends wound around drum 36 and their outer ends attached to the front axle 37 intermediate the king pin 38 and a wheel 17. The cables being wound around the drum in opposite directions the rotation of the drum will cause one cable to be paid out and the other to be wound in or shortened by the drum, thus imparting a turning movement to the axle carrying the steering wheels 17. Drum 36 is rotated by a rotary steam engine designated generally by the reference character 39 having a rotary power shaft 40, which carries at its outer end worm 41 which meshes with worm wheel 42 carried by the shaft 43, suitably journalled in brackets, not shown, carried by braces 44, 45 of the truck frame 15. Shaft 43 has mounted on the outer end thereof small gear wheel 43$^a$ which meshes with the larger gear wheel 43$^b$ mounted on the drum 36. Toothed gear 31 carried by the main power shaft 32 is adapted to be moved into or out of mesh with toothed travel gear 46, which is non-rotatably mounted on the upper end of the tubular driving shaft 47. Shaft 47 has mounted on the lower end thereof bevelled gear 48 which meshes with bevelled gear 49 mounted on the inner end of power transmission shaft 50. Power transmission shaft 50 has mounted on its opposite end bevelled gear 51 which meshes with bevelled gear 52, carried by the rear axle 53 on which the propelling wheels 16 are non-rotatably mounted. Frame 15 has superimposed thereon annularly toothed track 54 upon which platform 18 is rotatably mounted, there being anti-friction rollers 55 interposed between the platform and the track. Platform 18 has suitably journalled thereon shaft 56 which carries at its upper end toothed gear 57 for rotating the swing body and at its lower end the smaller toothed gear 58, which last named gear is constantly in mesh with the annular teeth of track 54. From the construction just described it can be readily seen that if gear 57 be caused to rotate a swinging movement upon its axis will be imparted to platform 18. To the transverse brace 59 of platform 18, which brace I preferably make of channel iron, I affix a spring actuated locking device designated generally by reference character 60, and which comprises a cylinder 61, a plunger rod 62 adapted to have reciprocal movement within the cylinder. The plunger rod terminates in a head 63 having projections or teeth 64, which are adapted to engage the teeth of gear 57. The plunger rod 62 has collar 65 affixed thereto between which collar and head 63 is placed a collar 91 and spring 66, which latter exerts an outward pressure on the head 63. Control lever 67 is provided with the usual spring actuated detent 67$^a$ for locking the lever in various positions on the segment 68. Control lever 67 which is pivotally mounted as at 69 to the platform 18 is pivotally connected at its lower end to one end of the link 70 which is pivotally connected to the vertical arm of bell crank 71, which is pivotally mounted on platform 18 as at 72. The upper or horizontal arm of the bell crank lever 71 is shaped to form a shifting fork for engaging in a well known manner the hub of the sliding gear 31 for reciprocally shifting the gear on shaft 32. Link 73 has one of its ends attached to the vertical arm of bell crank 71 at a point intermediate the pivot of the bell crank and the pivotal connection of the vertical arm with the link 70. The opposite end of the link 73 is pivotally connected to the lower end of the vertical arm of bell crank 74 which is non-rotatably mounted on rock bar 75, which bar is suitably journalled in platform 18. Vertical link 76 is pivotally connected at its lower end to the upper or horizontal arm of bell crank 74 as at 77 and has pivotal connection at its upper end with valve lever 78 for operating steam valve 79. Pipe 80 leads from the top of boiler 19 through its connecting pipe 81 to the engine 20. Pipe 82 in which is placed valve 79 leads from the top of the boiler 19 downwardly and then across to support 25 following the support downwardly and then to a point above the connecting member 30 where it is provided with a slip joint and is then carried down through the reciprocating sleeve 83 to a point below the frame 15 when it is carried forward to the steering engine 39 and is for the purpose of supplying steam to the steering engine. Pipe 82 is rigidly held against movement by the bracket 84 at a point adjacent its entrance into reciprocating sleeve 83 and by bracket 85 carried by the frame 15 at a point adjacent the lower end of the reciprocating sleeve to prevent chattering caused by the vibration of the machine when in operation. Rocking bar 75 has nonrotatably affixed thereto two levers 86 and 87, one on either side and adjacent to cylinder 61. Levers 86 and 87 have links 88 and 89 pivotally connected to their outer ends, which links pivotally engage two studs 90 carried at diametrically opposite points by collar 91, which operably engages collar 65 and bears adjacent the end of spring 66.

From the foregoing description it will be readily seen that if the control lever 67 is moved backwardly until detent 67ª engages recess 92 of segment 68 toothed gear 31 will be moved downwardly into mesh with gear 57 by the action of shifting fork 71 and that simultaneously with the downward movement of gear 31 rocking shaft 75 will be rocked clockwise, which will result in moving valve lever 78 to closed position by the upward movement of link 76. It will also be seen that when rocking bar 75 is rocked in clockwise direction to cut off the flow of steam from the boiler to the steering engine 39, that plunger 62 will be moved backwardly in cylinder 61, thereby withdrawing teeth 64 from engagement with toothed gear 57 which will permit the platform 18 to be rotated at will about its axis on frame 15. If the control lever 67 be moved in the reverse or forwardly direction until detent 67ª engages recess 93 of segment 68 toothed gear 31 will be moved upwardly into mesh with toothed gear 46, which operates the travel mechanism, and rocking bar 75 will be rotated in a contra-clockwise direction moving plunger 62 outwardly of cylinder 61, through spring 66 resiliently pressing teeth 64 of the head of the plunger into engagement with the teeth of gear 57, thereby locking the platform against rotation while the travel mechanism is in operative relation. The steering engine throttle control lever 94 is adapted to oscillate shaft 95, which shaft has non-rotatably affixed thereto shifter fork 96, which engages groove 97 of collar 98 with studs 99, 100 carried by the fork in a well known manner. Collar 98 is affixed to the upper extremities of reciprocating sleeve 83, which extends downwardly through driving shaft 47 with its lower end protruding from the lower end of the driving shaft, having a collar 101 similar to collar 98 attached to the lower extremity thereof. The groove of collar 101 is engaged by studs 102 and 103 carried by shifter fork 104. Arm 105 which terminates in shifter fork 104 passes transversely of frame 15 from the lower extremity of reciprocating sleeve 83 to rocking shaft 106 to which it is rigidly attached. Rocking shaft 106 has rigidly affixed to its forward end dependent lever 107. Link 108 is pivotally related at one of its ends, as at 109, to the throttle lever 110 of steering engine 39, and to lever 107 at its opposite end for operating the throttle lever, and link 111 is pivotally related at one of its ends to lever 107 and at its opposite end to the valve operating lever 112 for operating valve 113 interposed in the lower course of pipe 82 in order to drain the pipe and prevent freezing of water which may settle therein as the result of condensation of steam remaining in the pipe when the steam is cut out therefrom by the operation of control lever 67.

From the mechanism just described it will be readily perceived that if lever 94 be drawn backwardly that the reciprocating sleeve 83 will be drawn upwardly which will cause lever 107 to move links 108 and 111 in one direction, thereby moving the throttle valve and the drain valve 113 to one predetermined position, while the reverse or forward movement of lever 94 will move the valves to another predetermined position.

In cranes and other machines of the same general character heretofore constructed it has been a problem to prevent the swing body which usually carries a large heavy boom from rotating on its axis when the machine is travelling, especially is this the case when the surface over which the machine is travelling is rough or uneven. It will be seen from the structure herein described that when the travel gear is thrown into operation to propel the machine under its own power that the swing body is automatically locked against swinging movement and that the swing body may be locked against swinging movement by throwing the control lever when the machine is being towed.

I claim:

1. The combination with an automotive truck having a steering mechanism, a swing body pivotally related to the truck by a pivotal member and a steam boiler supported by the swing body, of a steam engine carried by the truck frame, and operatively related to said steering mechanism, a steam conduit passing from the boiler through the pivotal member to the engine, and means carried by the swing body for controlling the throttle of the engine.

2. The combination with an automotive truck of a steering mechanism therefor, a swing body supported by the truck, a pivotal connection between the swing body and the truck, a steam boiler supported by the swing body, a steam engine supported by the truck frame and operatively related to said steering mechanism, a steam conduit passing from the boiler through the pivotal connection to the engine, and means passing through the pivotal connection for controlling the throttle lever of the engine.

3. The combination with an automotive truck of a steering mechanism therefor a swing body pivotally related to the truck by a pivotal member, a steam boiler supported by the swing body, a steam engine supported by the truck and operatively related to said steering mechanism, a steam conduit passing from the boiler through the pivotal member to the engine, a sleeve surrounding the conduit having one of its ends operably related to the throttle of the engine, and means for operating the throttle through the medium of the sleeve.

4. The combination with an automotive truck, of a swing body pivotally supported by the truck, a steam engine carried by the swing body, gears carried by the swing body for transmitting power to the traction wheels of the truck and for rotating the swing body about its pivotal support, a sliding gear non-rotatably secured to the driving shaft of the engine, and adapted to be moved into and out of engagement with the gear for transmitting power to the traction wheels and into and out of engagement with the gear for rotating the swing body, a locking device carried by the swing body, and means for operating the sliding gear and the locking device synchronously.

5. The combination with an automotive truck of a steering mechanism therefor, a swing body pivotally supported by the truck, a steam engine carried by the swing body, and means carried by the swing body for engaging the traction wheels of the truck with the driving shaft of the engine, means carried by the swing body for engaging the driving shaft of the engine for rotating the swing body about its pivotal connection, means carried by the swing body for automatically disengaging the rotating means from the driving shaft of the engine when the traction means are engaged therewith and power means carried by said truck and operatively related to said steering mechanism for actuating the same.

6. The combination with an automotive truck, of a steering mechanism therefor, a swing body pivotally supported by the truck, a power shaft carried by the swing body and operably connected to a suitable source of power supply, a gear secured to rotate with said power shaft and slidable thereon, a series of intermediate gears adapted to be interposed between the first mentioned gear and the traction devices of the truck, a second series of gears adapted to be connected with said first mentioned gear for rotating the swing body about its pivotal support, means for operating said first mentioned gear to engage at will either said first or second series of gears or to neutral position, and power means carried by said truck and operatively related to said steering mechanism for actuating the same.

7. The combination with a steam truck having traction wheels and steering wheels, of a swing body supported on the truck by a pivotal connection, a steam boiler and steam engine supported on the swing body, a steering engine carried by the truck for operating the steering wheels, a steam conduit passing from the boiler through the pivotal connection to the last named engine, a valve interposed in the conduit, a gear carried by the swing body for rotating it about its pivot, a slidable gear secured to the driving shaft of the first named engine and adapted to be moved into and out of engagement with the gear for rotating the swing body, and means carried by the swing body for simultaneously operating the valve when the sliding gear is moved out of engagement with the rotating gear.

8. The combination with a steam truck having steering wheels, of a swing body supported on the truck by a pivotal connection, a steam boiler and a steam engine supported on the swing body, a steering engine carried by the truck for operating the steering wheels, a steam conduit passing from the boiler through the pivotal connection to the last named engine, a valve interposed in the conduit, a gear carried by the swing body for rotating it about its pivot, a slidable gear carried by the driving shaft of the first named engine, and adapted to be moved into engagement with the gear for rotating the swing body, and means carried by the swing body for simultaneously operating the valve when the sliding gear is moved into engagement with the rotating gear.

9. The combination with a steam truck having steering wheels and a steering engine carried by the truck, of a swing body mounted on the truck and pivotally related thereto by a pivotal member, a steam boiler and a steam engine carried by the swing body, a conduit passing from the boiler through the pivotal connection to the steering engine, a valve interposed in the conduit for the control of the flow of steam therethrough, a gear carried by the swing body for rotating it about its pivot, a gear slidably related to the driving shaft of the last named engine and adapted to engage the rotating gear, means carried by the truck for locking the gear for rotating the steering body about its pivot, and means carried by the truck for simultaneously operating the valve, the locking means and the sliding gear.

10. An automotive truck having steering wheels, a swinging body mounted on said truck, a power supplying device having a rotary driving shaft and supported by the truck frame, means operable from the swinging body for controlling said power supplying device, a worm secured to the driving shaft of the power supplying device and meshing with a worm gear carried by a shaft suitably journalled in the truck frame, a gear wheel secured to the last said shaft, a drum carried by the truck frame, a gear secured to the drum for imparting rotary movement thereto and being in mesh with said gear wheel, and flexible means carried by the drum for imparting movement to the steering wheels.

11. The combination with a truck having a steering mechanism of a swing body pivotally related to the truck by a pivotal member, a steam boiler supported by the swing body, of a steam engine carried by the truck frame for actuating said steering mechanism, a steam conduit passing from the boiler through the pivotal member to the engine, and means carried by the swing body for controlling the throttle of the engine.

12. The combination with a truck of a steering mechanism, a swing body supported by the truck, a pivotal connection between the swing body and the truck, a steam boiler supported by the swing body, a steam engine supported by the truck frame and operatively related to said steering mechanism, a steam conduit passing from the boiler through the pivotal connection to the engine, and means passing through the pivotal connection for controlling the throttle lever of the engine.

13. The combination with a truck of a steering mechanism, a swing body pivotally related to the truck by a pivotal member, a steam boiler supported by the swing body, a steam engine supported by the truck for actuating said steering mechanism, a steam conduit passing from the boiler through the pivotal member to the engine, a sleeve surrounding the conduit having one of its ends operably related to the throttle of the engine, and means for operating the throttle through the medium of the sleeve.

14. The combination with a truck having steering wheels, of a swing body supported on the truck by a pivotal connection, a steam boiler and steam engine supported on the swing body, a steering engine carried by the truck for operating the steering wheels, a steam conduit passing from the boiler through the pivotal connection to the last named engine, a valve interposed in the conduit, a gear carried by the swing body for rotating it about its pivot, a slidable gear secured to the driving shaft of the first named engine and adapted to be moved into and out of engagement with the gear for rotating the swing body, and means carried by the swing body for simultaneously operating the valve when the sliding gear is moved out of engagement with the rotary gear.

15. The combination with a truck having steering wheels, of a swing body supported on the truck by a pivotal connection, a steam boiler and a steam engine supported on the swing body, a steering engine carried by the truck for operating the steering wheels, a steam conduit passing from the boiler through the pivotal connection to the last named engine, a valve interposed in the conduit, a gear carried by the swing body for rotating it about its pivot, a slidable gear carried by the driving shaft of the first named engine and adapted to be moved into and out of engagement with the gear for rotating the swing body, and means carried by the swing body for simultaneously operating the valve when the sliding gear is moved into engagement with the rotating gear.

16. The combination with a truck having steering wheels and a steering engine carried by the truck, of a swing body mounted on the truck and pivotally related thereto by a pivotal member, a steam boiler and a steam engine carried by the swing body, a steam conduit passing from the boiler through the pivotal connection to the steering engine, a valve interposed in the conduit for the control of the flow of steam therethrough, a gear carried by the swing body for rotating it about its pivot, a gear slidably related to the driving shaft of the last named engine and adapted to engage the rotating gear, means carried by the swing body for locking the gear for rotating the steering body about its pivot, and means carried by the swing body for simultaneously operating the valve, the locking means and the sliding gear.

17. A truck having steering wheels, a swinging body mounted on said truck, an engine having a rotary drive shaft and being supported by the truck frame, a worm secured to said shaft and meshing with a worm wheel carried by a second shaft suitably journalled in said truck frame, a gear on said second shaft, a drum carried by the truck frame, a gear secured to said drum for imparting rotary movement thereto and being in mesh with said gear on said second shaft, flexible means interposed between the wheels of the truck and said drum for imparting steering movement to said wheels, and control means operable from the swing body for controlling said engine.

18. The combination with an automotive truck having a swing body pivotally mounted thereon of means for driving said truck, means for rotating said swing body, a power device, power transmitting means for connecting said power device to said driving means or to said swing body rotating means, a locking device co-operable with said body rotating means, and means operatively connected to said locking device and said power transmitting means, in a manner to actuate said locking device to secure said body against rotation when the power transmitting means is operatively connected to said truck driving means, and to render said locking device inoperative when said power transmitting means is operatively connected to said swing body rotating means.

In testimony whereof I have signed my name to this specification on this 16th day of February, A. D., 1922.

ROY S. MOORE.